United States Patent [19]
Hattori et al.

[11] Patent Number: 5,717,522
[45] Date of Patent: Feb. 10, 1998

[54] POLARIZING FILMS USED FOR OPTICAL SYSTEMS AND THREE-DIMENSIONAL IMAGE DISPLAYING APPARATUSES USING THE POLARIZING FILMS

[75] Inventors: Tomohiko Hattori, Nagoya; Takayuki Saito, Omiya, both of Japan

[73] Assignee: Fuji Photo Optical Co., Ltd., Omiya, Japan

[21] Appl. No.: 505,891

[22] Filed: Jul. 24, 1995

[30] Foreign Application Priority Data

Jul. 27, 1994 [JP] Japan ..................... 6-175283
Feb. 17, 1995 [JP] Japan ..................... 7-029363

[51] Int. Cl.$^6$ .......................................... G02B 27/26
[52] U.S. Cl. ................ 359/465; 359/464; 359/459; 348/58; 353/8
[58] Field of Search ........................ 359/462, 464, 359/465, 483, 489; 348/58; 353/7, 8; 349/15

[56] References Cited

U.S. PATENT DOCUMENTS

| | | | |
|---|---|---|---|
| 4,649,425 | 3/1987 | Pund | 348/52 |
| 5,050,961 | 9/1991 | Venolia | 359/465 |
| 5,113,285 | 5/1992 | Franklin et al. | 359/465 |
| 5,132,839 | 7/1992 | Travis | 359/462 |
| 5,264,964 | 11/1993 | Faris | 359/465 |
| 5,327,285 | 7/1994 | Faris | 359/483 |
| 5,537,144 | 7/1996 | Faris | 348/58 |

*Primary Examiner*—Ricky D. Shafer
*Assistant Examiner*—Darren E. Schuberg
*Attorney, Agent, or Firm*—Ronald R. Snider

[57] ABSTRACT

In an apparatus for displaying a three-dimensional image, an image display and a polarizing filter having an axis of easy transmission in a predetermined direction or an optically-active film having an optically-active portion at a predetermined position are combined together in a predetermined positional relationship, thereby easily displaying an image on the image display when a flat original image is prepared for forming the three-dimensional image and simplifying the structure of the apparatus with a reduced manufacturing cost. The apparatus for three-dimensionally displaying a planar image recorded on a polarizing film comprises a monochrome liquid crystal television screen which functions as a backlight source, a convex Fresnel lens for magnifying an image of the backlight source, an infrared illumination light source for illuminating a half of the face of an observer with infrared radiation, an infrared camera for capturing the illuminated image of the observer, and an interlaced-image synthesizing circuit which forms a binary-coded image obtained by the infrared television camera and its reversed image and interlaces the binary-coded image and reversed image to synthesize a signal.

10 Claims, 9 Drawing Sheets

POLARIZING FILMS USED FOR OPTICAL SYSTEMS AND THREE-DIMENSIONAL IMAGE DISPLAYING APPARATUSES USING THE POLARIZING FILMS

BACKGROUND OF THE INVENTION

1. Field of the Invention

This invention relates to polarizing films used for optical systems and apparatuses using these polarizing films to display three-dimensional images. In particular, the present invention relates to the polarizing films and apparatuses by which still and motion pictures such as medical and art images can be observed three-dimensionally.

2. Description of the Prior Art

Recently, in the medical field, technologies have been developed for using MRI, CT, and the like to observe cross sections of inspected parts. In order to further improve the accuracy in diagnosis, there has been a demand for establishing a technology for three-dimensionally observing the inspected parts. Also, there has been a demand for establishing a technology for displaying a three-dimensional image from a two-dimensional image depicting an object of arts and crafts.

As means for three-dimensionally observing the image information depicted on a plane, holographic image-reproducing technologies have conventionally been known. However, it takes enormous time and labor to make a hologram while the apparatus for reproducing the holographic three-dimensional images becomes complicated and expensive.

SUMMARY OF THE INVENTION

In view of the foregoing, the object of the present invention is to provide a polarizing film used for optical systems which easily forms image information on a plane in order to obtain a three-dimensional image and with which an image reproducing apparatus can be made easily at a low cost.

Another object of the present invention is to provide an apparatus for displaying three-dimensional images using such a polarizing film.

The first polarizing film used for optical systems in accordance with the present invention comprises an optically-active film and a polarizing filter. The optically-active film is formed by alternately arranged optically-active and optically-inactive portions. The optically-active portion rotates the plane of polarization of an incident polarized light component by 90 degrees and then emits it, while the optically-inactive portion emits an incident polarized light component without rotating its plane of polarization. The polarizing filter transmits only the polarized light component whose plane of polarization lies in a predetermined direction after it has passed through the optically-active film.

The optically-active portion of the film may be formed, for example, by a twisted nematic liquid crystal or a λ/2 optical phase plate.

The second polarizing film used for optical systems in accordance with the present invention comprises the above-mentioned first polarizing film and an image display or print film. The image display is formed by alternately arranged first and second display portions respectively showing first and second images. The first polarizing film and the image display are combined together to form the second polarizing film such that the optically-active and optically-inactive portions respectively face the first and second display portions.

The third polarizing film used for optical systems in accordance with the present invention comprises a film-like polarizing filter and an image display or print film. The polarizing filter is formed by alternately arranged first and second polarizing filter pieces which respectively have first and second axes of easy transmission of polarized light. These axes are perpendicular to each other. The image display is formed by alternately arranged first and second display portions respectively showing first and second images. The polarizing filter and the image display are combined together to form the third polarizing film such that the first and second filter pieces respectively face the first and second image display portions.

In the second and third polarizing films, the image display may be formed by a printing film on which a predetermined image is exposed and developed and the polarizing filter attached to a surface of this polarizing film.

The above-mentioned first and second images may be used as images for forming three-dimensional pictures for right-eye viewing and left-eye viewing, respectively.

The first apparatus using the polarizing film for displaying a three-dimensional image in accordance with the present invention comprises a backlight output means and a convex lens. The backlight output means outputs, as a backlight component for right-eye viewing, one of the polarized light component output from the polarizing film through the above-mentioned optically-active portion and the polarized light component output from the above-mentioned optically-inactive portion, while outputting the other as a backlight component for left-eye viewing. The convex lens acts such that a light image formed by the two polarized light components from the backlight output means can be recognized by an observer, who is positioned on the opposite side of the backlight output means by way of the polarizing film, as an enlarged virtual image and thereby the background of the polarizing film placed at a predetermined position in front of the observer is illuminated.

The second apparatus using the polarizing film for displaying a three-dimensional image in accordance with the present invention comprises a backlight output means and a convex lens. The backlight output means outputs, as a backlight component for right-eye viewing, one of the polarized light component passing through the above-mentioned first polarizing filter piece and the polarized light component and the polarized light component passing through the above-mentioned second polarizing filter piece, while outputting the other as a backlight component for left-eye viewing. The convex lens acts such that a light image formed by the two polarized light components from the backlight output means can be recognized by an observer, who is positioned on the opposite side of the backlight output means by way of the polarized film, as an enlarged virtual image and thereby the background of the polarizing film placed at a predetermined position in front of the observer is illuminated.

The backlight output means may be formed by a television screen. In this case, the light images acting as the backlight component for right-eye viewing and backlight component for left-eye viewing may respectively be formed by right-side and left-side face images of the observer or their vicinities displayed on the television screen.

The above-mentioned twisted nematic liquid crystal has a characteristic such that a polarized light component introduced into the optically-active portion formed by such a liquid crystal is emitted with its plane of polarization being rotated by 90 degrees.

The above-mentioned λ/2 optical phase plate has a characteristic such that a polarized light component introduced into the optically-active portion formed by such a liquid crystal is emitted with its plane of polarization being rotated by 90 degrees.

The above-mentioned image display includes, in addition to the aforesaid printing film in which a predetermined image has been exposed and developed to form a still image, a liquid crystal display panel which can show moving pictures or still images in response to input signals, for example.

In the above-mentioned polarizing films, "facing" of the image display and polarizing filters can encompass the cases where they are laminated together as well as the cases where they are positioned with a small space between them.

The first polarizing film constructed as mentioned above has the optically-active film formed by alternately arranged optically-active and optically-inactive portions. The polarized light component introduced into the optically-active portion is emitted with its plane of polarization being rotated by 90 degrees, while that introduced into the optically-inactive portion is emitted without its plane of polarization being rotated. Accordingly, the polarized light component introduced into this polarizing film is emitted at the optically-active portion as the polarized light component having a plane of polarization in a direction perpendicular to its original plane of polarization, while it is emitted at the optically-inactive portion as the polarized light component maintaining the original plane of polarization of the incident polarized light component.

The polarizing filter disposed on the light-outputting side of the optically-active film has a function such that the polarized light component emitted from the optically-inactive portion is transmitted therethrough and the polarized light component emitted from the optically-active portion is blocked when a polarized light component whose plane of polarization coincides with the direction of the axis of easy transmission of polarized light of the polarizing filter is introduced into the above-mentioned optically-active film, while the polarized light component emitted from the optically-active portion is transmitted therethrough and the polarized light component emitted from the optically-inactive portion is blocked when a polarized light component having a plane of polarization perpendicular to the direction of the axis of easy transmission of polarized light of the polarizing filter is introduced into the above-mentioned polarizing Accordingly, in this polarizing film, whether the position for emitting the polarized light component corresponds to the optically-active portion or the optically-inactive portion depends on two kinds of the incident polarized light components whose planes of polarization are perpendicular to each other.

When the above-mentioned optically-active portion is formed by a twisted nematic liquid crystal or λ/2 optical phase plate, the optical rotation of polarized light can be manipulated with a high accuracy while minimizing the loss in the amount of light.

In the second polarizing film in accordance with the present invention as constructed above, the optically-active film is formed by alternately arranged optically-active portion, in which the plane of polarization of an incident polarized light component is rotated by 90 degrees, and optically-inactive portion, in which an incident polarized light component is emitted without its plane of polarization being rotated; and a polarizing filter, through which a polarized light component having a predetermined plane of polarization is transmitted, is disposed so as to face the side of the optically-active film where the polarized light is emitted. Only the polarized light component whose plane of polarization lies in a single predetermined direction is emitted from the polarizing filter. Accordingly, only the polarized light component introduced into the optically-inactive portion having a plane of polarization in the predetermined direction can be emitted from the optically-inactive portion, while only the polarized light component introduced into the optically-active portion having a plane of polarization in a direction perpendicular to the predetermined direction can be emitted from the optically-active portion. The first image display portion for displaying the first image and the second image display portion for displaying the second image are respectively positioned so as to correspond to the optically-active and optically-inactive portions by way of the polarizing filter. The first image information is output from the polarizing film as being carried by the polarized light component introduced into the optically-active portion having a plane of polarization in a direction perpendicular to the predetermined direction, while the second image information is output from the polarizing film as being carried by the polarized light component introduced into the optically-inactive portion having a plane of polarization in the predetermined direction.

In the third polarizing film in accordance with the present invention as constructed above, a film-like polarizing filter and the image display overlaps with each other such that the first filter piece having an axis of easy transmission of polarized light in the first direction and the second filter piece having an axis of easy transmission of polarized light in the second direction, which is perpendicular to the first direction, are positioned so as to respectively correspond to the first image display portion for displaying the first image and the second image display portion for displaying the second image. Accordingly, when the third polarizing film is illuminated with a predetermined light component, the first polarized light component carrying the first image information and the second polarized light component carrying the second image information, whose planes of polarization are perpendicular to each other, are output.

Accordingly, only the first image can be viewed by an observer when a first polarizing plate whose axis of easy transmission of polarized light lies in the same direction as that of the first polarizing filter piece is placed between the third polarizing film and the observer, while only the second image can be viewed by the observer when a second polarizing plate whose axis of easy transmission of polarized light lies in the same direction as that of the second polarizing filter piece is placed between the third polarizing film and the observer.

When the first and second polarizing plates are respectively disposed at positions of right-eye and left-eye lenses to form a pair of polarizing glasses and the first and second images are respectively used as right-eye and left-eye images for a three-dimensional picture, an image recorded on the polarizing film can be viewed three-dimensionally through such polarizing glasses.

Also, when one of the first and second images and the other are respectively used as right-eye and left-eye images such that the polarized light component carrying the image information of the right-eye image and the polarized light component carrying the image information of the left-eye image are respectively introduced into the right and left eyes, an image displayed on the polarizing film can be viewed three-dimensionally.

When the polarizing film is formed by a printing film, on which a predetermined image has been exposed and developed, and a polarizing filter attached to a surface thereof, an image recording medium for a three-dimensional picture can easily be manufactured with a low cost.

In the first and second apparatuses for displaying a three-dimensional image as constructed above, the right-eye and left-eye images recorded on the polarizing film are respectively illuminated by predetermined backlight components by means of the backlight output means and the convex lens so as to be recognized by their corresponding eyes of an observer, thereby forming a three-dimensional image.

Also, when the backlight output means is formed by a television screen and the backlight component for the right eye and the backlight component for the left eye displayed thereon respectively correspond to the light images of right-side and left-side face images of the observer or their vicinities, these light images can always perform their function as backlight, even when the observer moves, thereby establishing a self-tracking system.

This mechanism is specifically explained with reference to FIG. 9. According to the apparatus depicted in this drawing, LED 301 is disposed on the right side of an observer 300 to illuminate only the right half of the face of the observer 300 from this side. The face image of the observer 300, in which only the right half is bright, is captured by a CCD camera 302 and displayed on a CRT 303 to form an inverted image 305 whose right half of the face has become a light-emitting portion 304. When this light-emitting portion 304 is used as the light source magnified by a convex lens 306, a directional illumination can easily be constructed. Namely, when the magnitude and position of the face image on the CRT 303 is adjusted such that the right and left eyes of the observer can only view the virtual images of own right half of the face (light-emitting portion 304) and left half of the face (dark portion 307), respectively, an illumination whose size corresponds to the diameter of the lens can be formed only for the right eye of the observer 300. Then, when the above-mentioned polarizing film is disposed in front of the convex lens 306, a directional backlight component can be formed. The optical system for the left eye can be constructed in a similar manner.

Since the light source is the observer's own image 305, it moves in response to the distance of movement of the observer 300 even when the latter moves toward right and left as mentioned above. This function forms a self-tracking system without requiring a sensor.

DESCRIPTION OF THE PREFERRED EMBODIMENTS

In the following, embodiments of the present invention will be explained with reference to the drawings.

Figure 1:
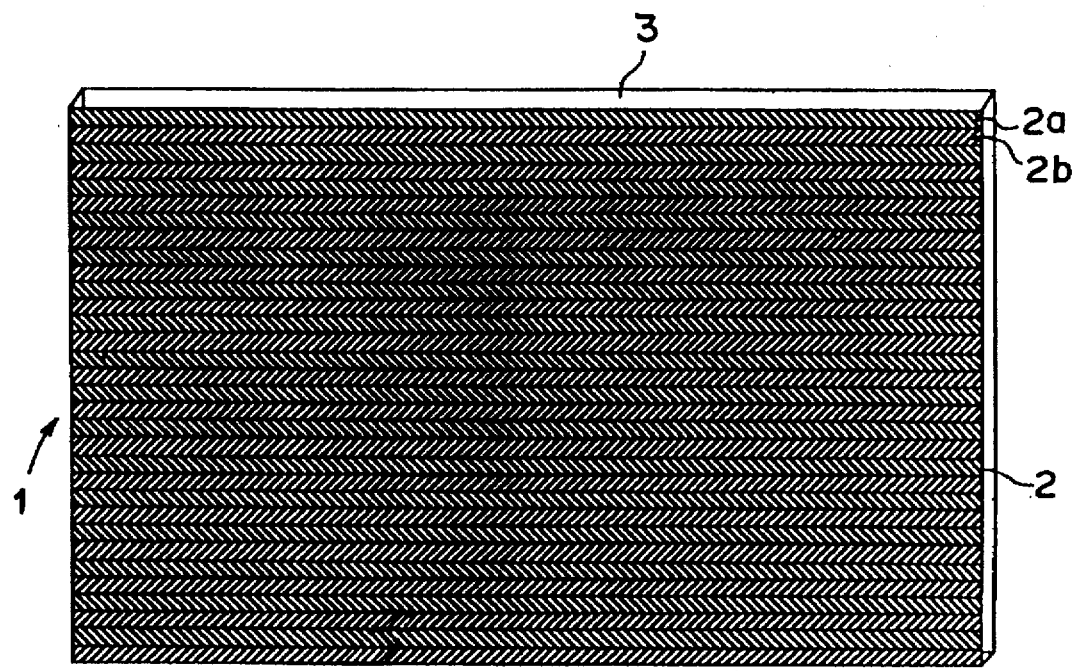
FIG. 1 is a perspective view showing a polarizing film in accordance with the first embodiment of the present invention.

FIG. 1 is a perspective view showing a polarizing film in accordance with the first embodiment of the present invention.

The polarizing film 1 has a polarizing filter 2, in which strip-like first polarizing filter pieces 2a and second polarizing filter pieces 2b having axes of easy transmission of polarized light perpendicular to each other are alternately aged, and a printing film 3 attached thereto. In the printing film 3, images for right and left eyes are recorded on the positions corresponding to the first polarizing filter pieces 2a and the second polarizing filter pieces 2b, respectively. Of course, these images for right and left eyes are interchangeable.

When the polarizing film 1 is illuminated with a predetermined light component, the image information for the right eye is output as being carried by the first polarized light component which has passed through each of the first polarizing filter pieces 2a, while the image information for the left eye is output as being carried by the second polarized light component which has passed through each of the second polarizing pieces 2b.

The printing film 3 is a photographic film which is used as a photosensitive material and comprises a film base (e.g. PET, cellulose derivative, or polyester) and a photographic emulsion coated and dried thereon. It may be a general photographic film which is commercially available. A protective layer or the like, for example, may be formed on the photographic emulsion layer.

Figure 2:
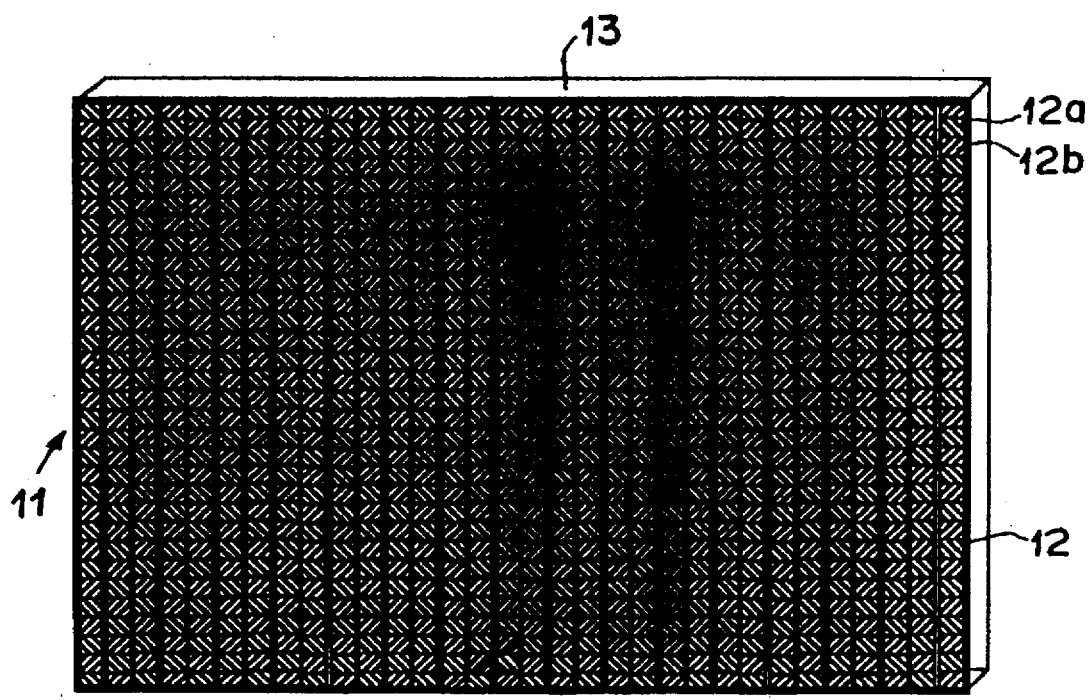
FIG. 2 is a perspective view showing a polarizing film in accordance with a modified example of the embodiment shown in FIG. 1.

The form and size of the first and second polarizing filter pieces 2a, 2b can appropriately be adjusted as long as the pattern of their arrangement is such that the total area of the first polarizing filter pieces 2a is substantially the same as that of the second polarizing filter pieces 2b. For example, as shown in FIG. 2, a polarizing film 11 may have a polarizing filter 12, in which substantially square first and second polarizing filter pieces 12a, 12b having axes of easy transmission of polarized light perpendicular to each other are arranged in a hound's tooth check pattern, and a predetermined printing film 13 attached thereto.

Figure 3:
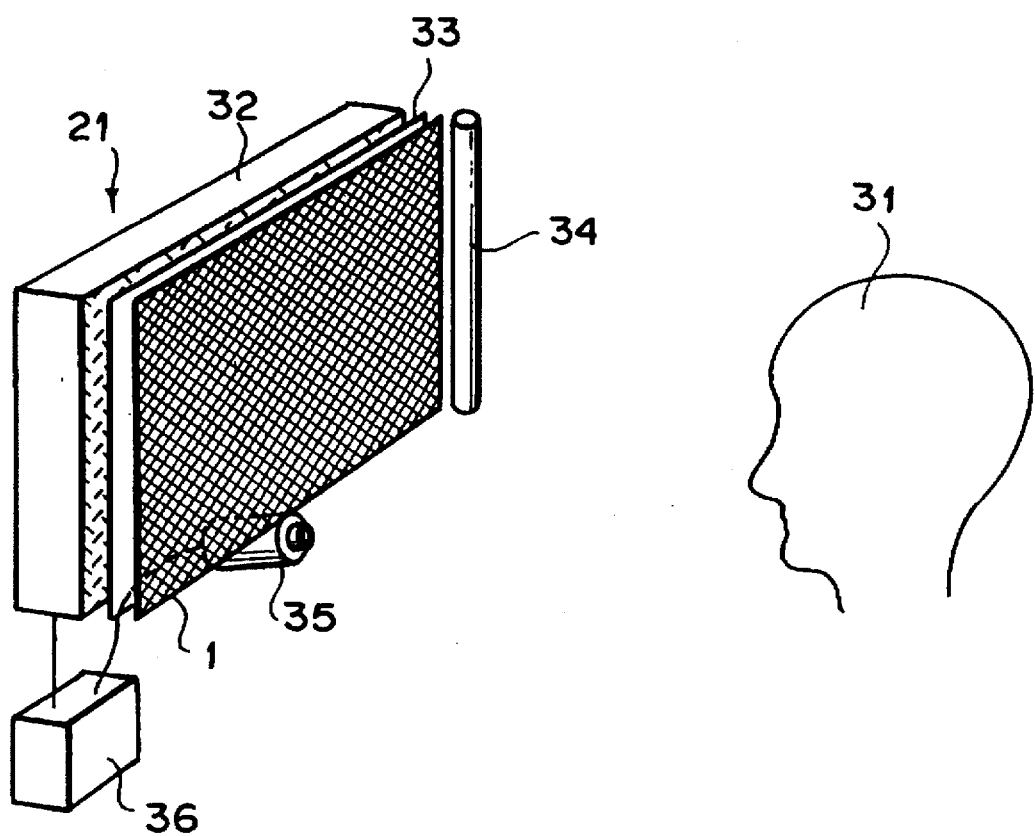
FIG. 3 is a schematic view showing a three-dimensional image displaying apparatus in accordance with an embodiment of the present invention.
Figure 4:
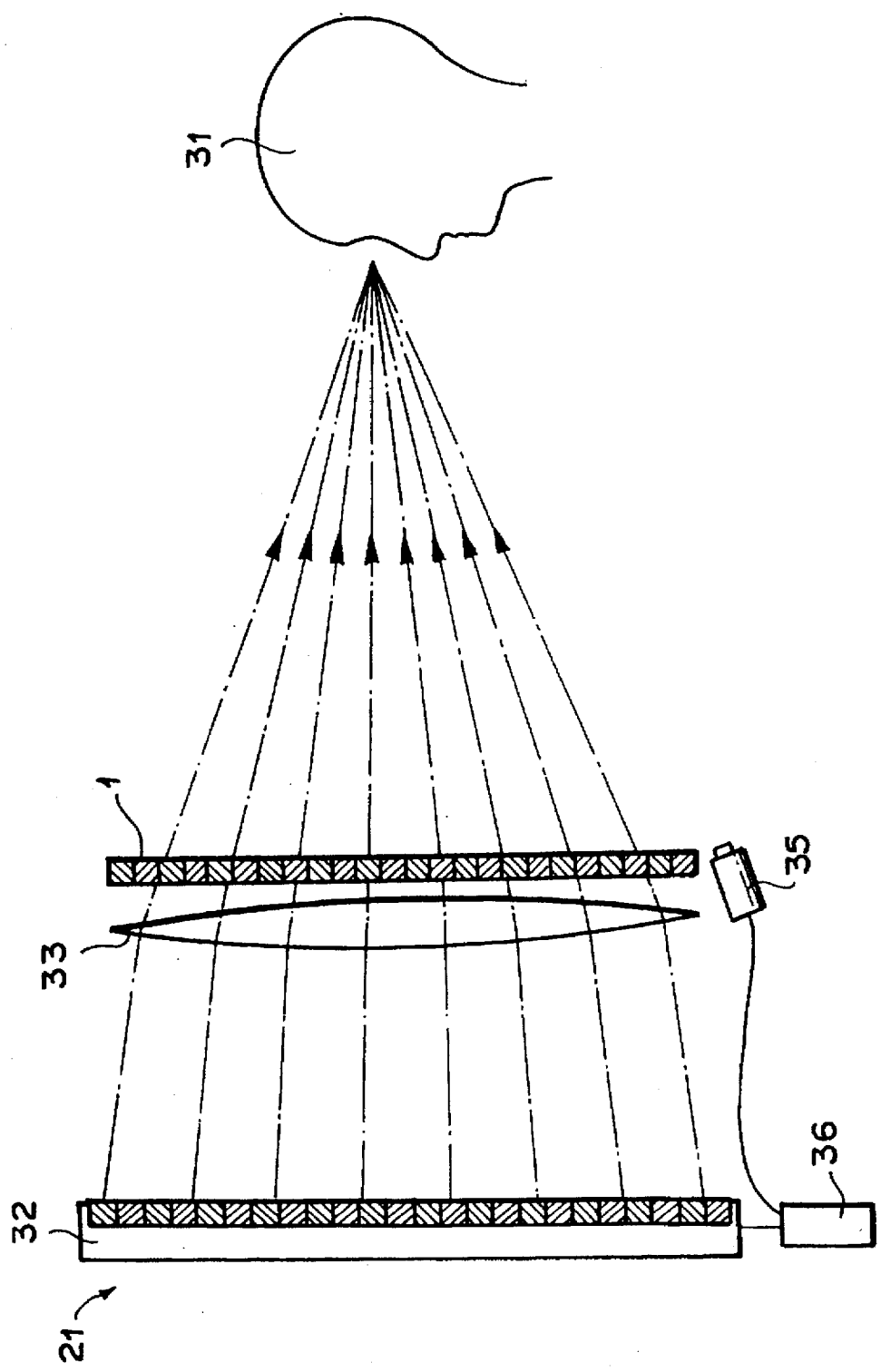
FIG. 4 is a side view of the apparatus shown in FIG. 3.

FIG. 3 is a schematic view showing a three-dimensional image displaying apparatus in accordance with an embodiment of the present invention. FIG. 4 is a schematic view showing this apparatus from one side.

The apparatus 21 is used for three-dimensionally viewing a flat image recorded on the polarizing film 1. In front of an observer 31, the apparatus has a monochrome liquid crystal television screen 32 which functions as a light source for backlight. A convex Fresnel lens 33 is disposed between the monochrome liquid crystal television screen 32 and the observer 31 to enlarge the image of the light source for backlight.

Further, the apparatus 21 has an infrared illumination light source 34 for illuminating one half of the face (the right half of the face in FIG. 3) of the observer 31 with infrared radiation; an infrared television camera 35 which is sensitive to such infrared radiation and used for capturing the illuminated image of the observer 31; and an interlaced-image synthesizing circuit 36 which binary-codes the image obtained by the infrared television camera 35 according to its level of luminance, forms a reversed image of the binary-coded image of the observer's face (simply referred to as "reversed image" in the following), and then interlaces the binary-coded image and the reversed image with each other to synthesize a signal The polarizing film 1 is disposed on the side of the convex Fresnel lens 33 facing the observer 31 and supported by a polarizing-film holding means which is not depicted.

On the surface of the monochrome liquid crystal television screen 32, strip-like first polarizing filter pieces (having their axis of easy transmission of polarized light in a first direction) and strip-like second polarizing filter pieces (having their axis of easy transmission of polarized light in a second direction which is perpendicular to the first direction) are alternately attached so as to vertically align with scanning lines in the first and second fields, respectively.

The distance T between the surface of the convex Fresnel lens 33 and that of the monochrome liquid crystal television screen 32 is set to a predetermined value which is slightly greater than the focal length f of the convex Fresnel lens 33 such that a light image displayed on the monochrome liquid crystal television screen 32 can be seen by the observer 31 as a slightly-enlarged erect virtual image.

In the face image of the observer 31 captured by the infrared television camera 35, as previously explained, the right half illuminated by the infrared illumination light source 34 has a higher luminance. Accordingly, the binary-coded image of the face of the observer 31 comprises a high luminance portion located at the right half and the remaining low luminance portion. On the other hand, its reversed image comprises a high luminance portion at the left half and the remaining low luminance portion.

Accordingly, the image synthesized by the interlaced-image synthesizing circuit 36 has a first field image (or second field image) in which the right half of the face has a high luminance and a second field image (or first field image) in which the left half of the face has a high luminance.

When an interlaced image synthesized as mentioned above is displayed on the monochrome television screen 32, the light image of the half face on each field, which functions as backlight when the polarizing film 1 is observed, is output, through the polarizing filter piece corresponding to the field image, as a polarized light component having a plane of polarization in a predetermined direction.

Namely, the light image of the right half of the face is output through the first polarizing filter pieces as the polarized light component having the first plane of polarization, whereas the light image of the left half of the face is output through the second polarizing filter pieces as the polarized light component having the second plane of polarization which is perpendicular to the first plane of polarization.

Thereafter, due to the convex Fresnel lens 33, the light image of the right half of the face functions as a backlight component only for the right eye of the observer 31, while the light image of the left half of the face functions as a backlight component only for the left eye of the observer 31. The diameter of each backlight component is the same as that of the lens. In order for these light images to function as the backlight components, the size and position of the face image on the liquid crystal of the monochrome television screen 32 should be adjusted beforehand.

Then, the light image passes through the polarizing film 1. Since the polarized light component which has the first plane of polarization carrying the light image of the right half of the face can only pass through the first polarizing filter pieces 2a in the first polarizing film 1, the image for the right eye recorded on the printing film 3 at a portion corresponding to the first polarizing filter piece 2a is finally illuminated by the light image of the right half of the face so as to be recognized by the right eye of the observer 31. Similarly, since the polarized light component which has the second plane of polarization carrying the light image of the left half of the face can only pass through the second polarizing filter pieces 2b in the first polarizing film 1, the image for the left eye recorded on the printing film 1 at a portion corresponding to the second polarizing filter piece 2b is finally illuminated by the light image of the left half of the face so as to be recognized by the left eye of the observer 31. Accordingly, the observer 31 can three-dimensionally view the three-dimensional image recorded on the polarizing film 1.

Since the three-dimensional viewing can be effected by this apparatus when the position of the observer 31 is within a predetermined range, a plurality of the observers 31 can simultaneously recognize a single three-dimensional image.

Although the first and second polarizing filter pieces are attached to the liquid crystal surface of the monochrome liquid crystal television screen 32 in the apparatus shown in FIG. 4 such that the light image in the first field image and the light image in the second field image are respectively carried by the polarized light components whose planes of polarization are perpendicular to each other, the technique for making the polarized light components having planes of polarization perpendicular to each other is not limited thereto. For example, as in the apparatus 21a shown in FIG. 5, a spatial modulator 41, which rotates the angle of direction of polarization by 90 degrees at each timing for switching image projection (e.g. timing for starting the scanning in each field) to allow a polarized light component with a predetermined plane of polarization to pass through, can be disposed between the liquid crystal surface of the monochrome liquid crystal television screen 32a and the convex Fresnel lens 33 without any polarization filter piece being attached to the liquid crystal surface.

In order to prepare the polarizing films shown in the foregoing embodiment, there are two kinds of techniques, for example, as explained in the following:

Namely, according to the first technique, a mask (first mask) having a pattern of alternately arranged bright and dark portions is disposed on an image film such as a printing film and then an image for the right eye (or an image for the left eye) is recorded thereon (or subjected to exposure and development in the case with the printing film), while a mask (second mask) having a pattern whose bright and dark portions are in reverse to those of the first mask is disposed on an image film such as a printing film and then an image for the left eye (or an image for the right eye) is recorded thereon (or subjected to exposure and development in the case with the printing film). Thereafter, the first polarizing filter pieces and the second polarizing filter pieces (having an angle of direction of polarization perpendicular to the axis of easy transmission of polarized light of the first polarizing filter pieces) are respectively attached to the positions where the images for the right and left eyes are recorded.

Alternatively, without using two masks as noted above, one mask (e.g. the above-mentioned first mask) can be disposed on the image film to record one of the images for the right and left eyes and then moved by one pitch thereon to record the other image.

According to the second technique, the first and second polarizing filter pieces are alternately attached to an image film such as a printing film in a predetermined pattern. Then, the images for the right and left eyes are recorded thereon (or exposed and developed in the case with the printing film) by the polarized light components passing through the first and second polarizing filters, respectively. In this case, the polarized light components for recording images have to be introduced from the polarizing filter side.

When a printing film is used as the image film, the polarizing filter pieces are generally attached to the surface of the printing film which is opposite to the emulsion surface. However, the polarizing filter pieces can be attached to the emulsion side when they are permeable to water.

Although one of the first and second field images displayed on the monochrome liquid crystal television screen is used as the image for the right eye and the other is used as the image for the left eye in the above embodiment, the projection of the images for the right and left eyes may be switched frame by frame. In this case, a spatial modulator such as the one shown in FIG. 5 may be used to change the angle of plane of polarization of the polarized light at a predetermined timing.

The thicknesses of the polarizing filter pieces and printing films can be set to any value as long as the light transmissivity is not decreased very much and their strength can be maintained.

Figure 6:
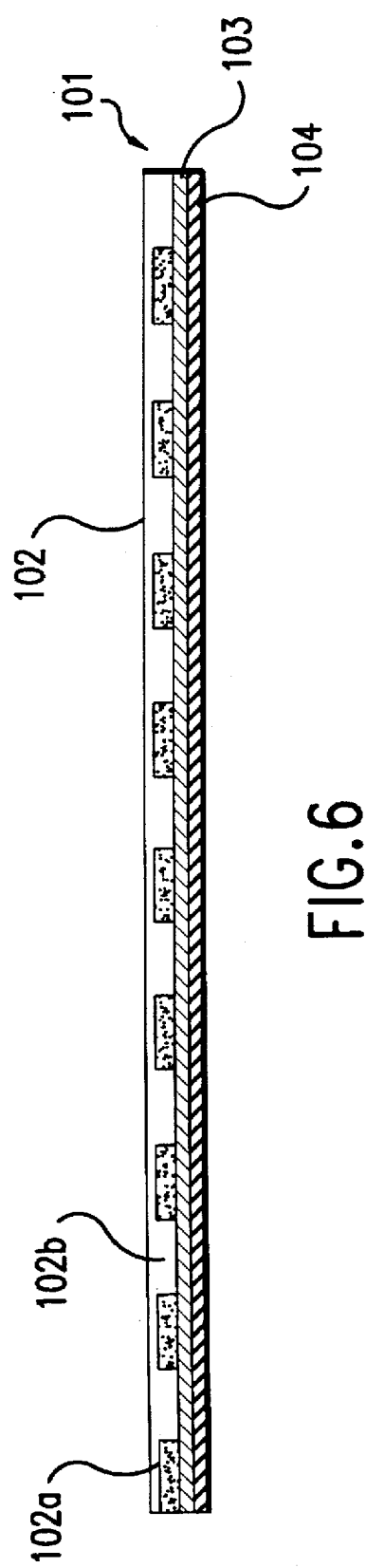
FIG. 6 is a side view showing a polarizing film in accordance with the second embodiment of the present invention.

The polarizing film in accordance with the second embodiment of the present invention will be explained hereinbelow. FIG. 6 is a schematic side view showing a polarizing film 101 in accordance with this embodiment. This polarizing film 101 comprises an optically-active film 102 in which optically-active portions 102a, mainly composed of a liquid crystal part, and optically-inactive portions 102b made of a transparent plastic part are alternately arranged in strips; a polarizing filter 103 having its axis of easy transmission of polarized light in a predetermined direction; and a printing film 104 which are attached together.

The liquid crystal part constituting the optically-active portion 102a is made of a misted nematic liquid crystal filler. Accordingly, the optically-active portion 102a functions to emit the incident polarized light component with its plane of polarization being rotated by 90 degrees. On the other hand, the optically-inactive portion 102b emits the incident polarized light component without rotating its plane of polarization.

In the printing film 104, which is similar to the printing film 3 in the polarizing film 1 in the first embodiment, images for the right and left eyes are respectively recorded at positions corresponding to the optically-active portions 102a and optically-inactive portions 102b in the optically-active film 102. Of course, the image for the right eye and the image for the left eye are interchangeable.

When this polarizing film 101 is illuminated with a predetermined light component, the image information for the right eye is output as being carried by the first polarized light component which has passed through the optically-active portions 102a, while the image for the left eye is output as being carried by the second polarized light component which has passed through the optically-inactive portions 102b.

Figure 7:
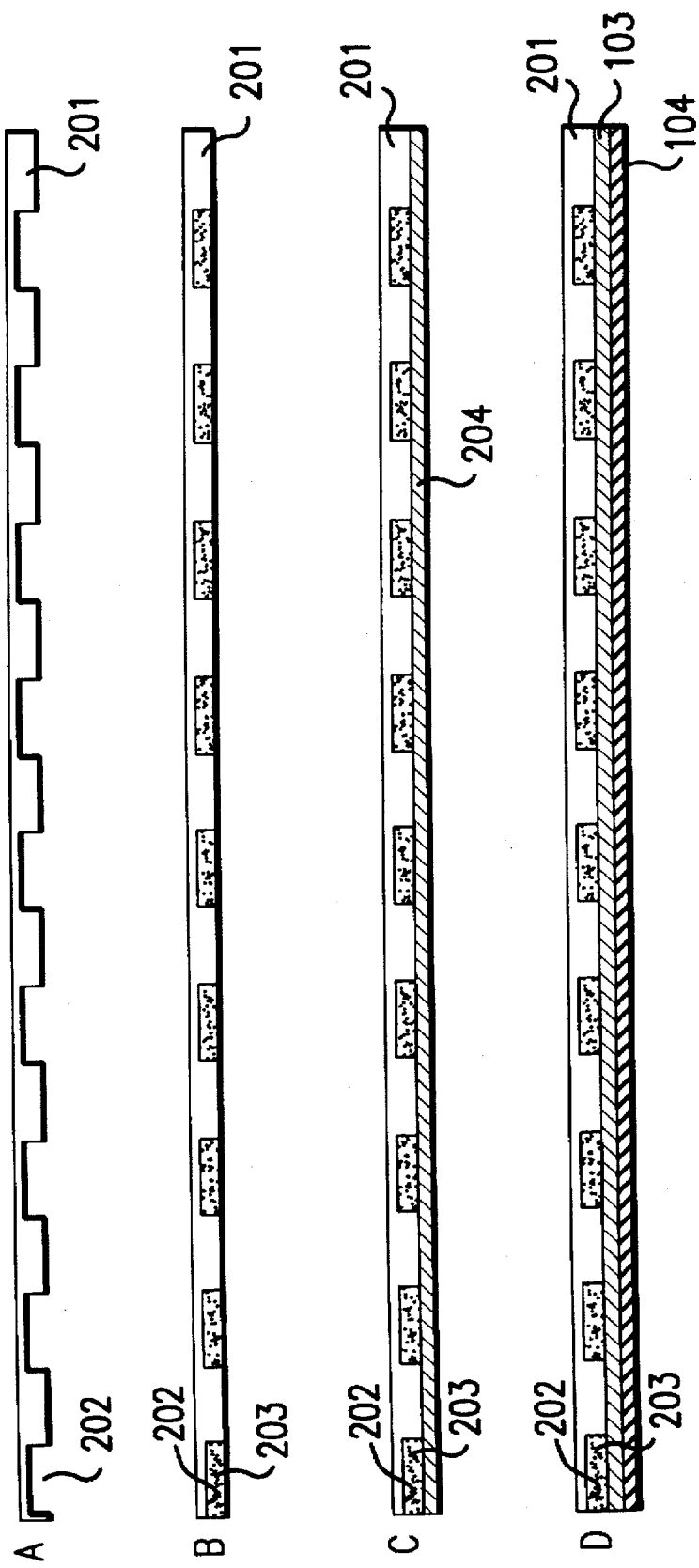
FIG. 7 is an explanatory view showing step by step how the polarizing film shown in FIG. 6 is prepared.

FIG. 7 is a drawing showing the steps for preparing the polarized film 101 in accordance with the second embodiment.

In order to prepare the polarizing film 101, as the first step, a thin transparent plate 201 made of a plastic or the like is subjected to lithography or pressure to form a plurality of grooves 202 extending between its right and left ends [FIG. 7(A)].

Figure 8:
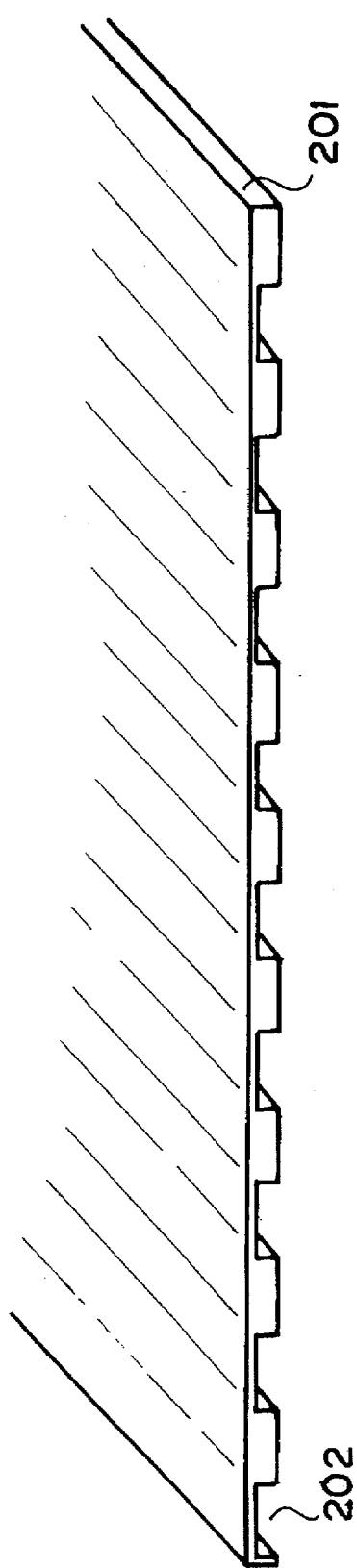
FIG. 8 is a perspective view showing a thin transparent plate depicted in FIG. 7(A).
Figure 9:
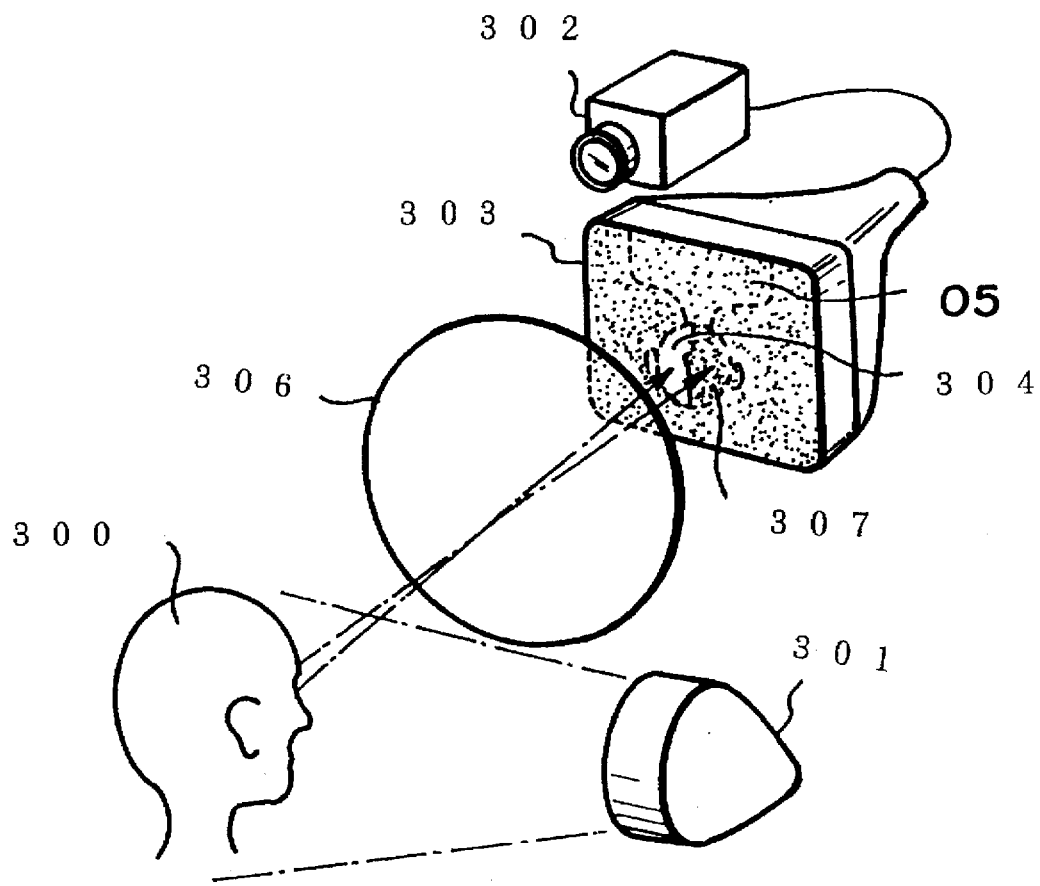
FIG. 9 is a schematic view explaining the principle of the apparatus in accordance with the present invention.

FIG. 8 is a perspective view showing the transparent plate 201 with thus formed grooves 202. The indent portion formed by the groove 202 and the protruded portion without the groove have the same width.

Then, each of the grooves 202 is filled with a twisted nematic liquid crystal 203 [FIG. 7(B)].

Next, the film-like polarizing filter 103 is attached to the open side of each groove 202 so as to enclose the liquid crystal into the groove 202 [FIG. 7(C)].

Thereafter, a photosensitive emulsion is disposed on the polarizing filter 103. On this emulsion, the images for the right and left eyes are exposed and developed to form the printing film 104 [FIG. 7(D)].

When a polarized light component having the same direction (referred to as "first direction" hereinbelow) as the axis of easy transmission of polarized light of the polarizing filter 103 is introduced into the polarizing film 101, the optically-active portion 102a emits a polarized light component having a plane of polarization in a direction (referred to as "second direction" hereinbelow) perpendicular to the first direction while the optically-inactive portion 102b emits a polarized light component having a plane of polarization in the first direction as it is.

Accordingly, the polarized light component output from the optically-active portion 102a is blocked by the polarizing filter 103 while the polarized light component output from the optically-inactive portion 102b passes through the polarizing filter 103.

When the polarizing film 101 is illuminated with a polarized light component having a plane of polarization in the first direction, a polarized light component carrying the image information for the left eye is output from the polarizing film 101 since the image for the left eye has been recorded on the printing film 104 at the positions corresponding to the optically-inactive portions 102b.

When the polarizing film 101 is illuminated with a polarized light component having a plane of polarization in the second direction, contrary to the case with the polarized light component having a plane of polarization in the first direction, only the polarized light component output from the optically-active portion 102a passes through the polarizing filter 103. Since the image for the right eye has been recorded on the printing film 104 at the positions corresponding to the optically-active portions 102a, a polarized light component carrying the image information for the right eye is finally output from the polarizing film 101 when the latter is illuminated with the polarized light component having a plane of polarization in the second direction.

The form and size of the optically-active portions 102a and optically-inactive portions 102b in the optically-active film 102 can be selected appropriately as long as they are arranged in a pattern where the total area of the optically-active portions 102a is substantially the same as that of the optically-inactive portions 102b. For example, as shown in FIG. 7 which depicts the polarizing filter 103 in accordance with the first embodiment, the optically-active film 102 in which the optically-active portions 102a and the optically-inactive portions 102b are arranged in a hound's moth check may be attached to the predetermined printing film 104 by way of the polarizing filter 103.

Also, the optically-inactive portions 102b may be filled with the twisted nematic liquid crystal as in the case of the optically-active portions 102a and then a predetermined voltage may be applied thereto such that the incident polarized light component can pass therethrough without its plane of polarization being rotated.

Figure 5:
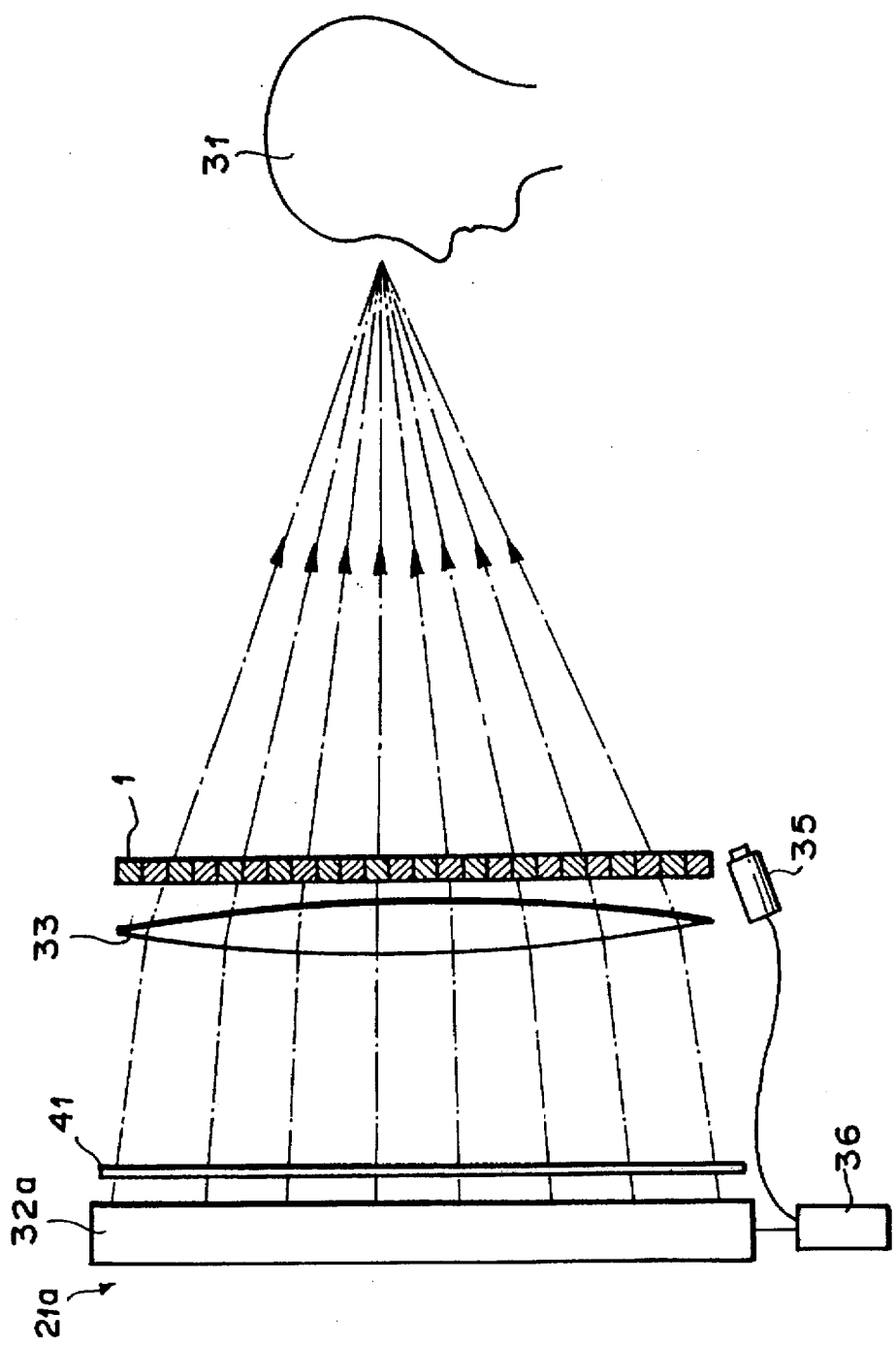
FIG. 5 is a schematic view showing a three-dimensional image displaying apparatus in accordance with an embodiment of the present invention which is different from that shown in FIG. 3.

Further, when the polarizing film 1 is substituted by the polarizing film 101 in the apparatuses for displaying three-dimensional images shown in FIGS. 4 and 5, a plurality of observers 31 can recognize a single three-dimensional image. In this case, however, the direction of the plane of polarization of the polarized light component carrying the light image for backlight should be taken care of. Namely, in the above embodiment, the polarized light component corresponding to the light image of the right half of the face should carry the image for the right eye while having its plane of polarization in the second direction; whereas the polarized light component corresponding to the light image of the left half of the face should carry the image for the left eye while having its plane of polarization in the first direction.

The printing film constituting the polarizing film is not limited to photographic films such as silver halide films but may be any material on which the recorded image can be actualized immediately after the recording or by way of a predetermined processing.

Without being restricted to the foregoing embodiments, the polarizing film in accordance with the present invention may be modified in various ways.

For example, a liquid crystal display panel may be used as the image display although a brighter image can be obtained when the above-mentioned printing film is used.

Namely, in lieu of the polarizing film 1 or polarizing film 101, a color liquid crystal display panel (or monochrome liquid crystal display panel) may be disposed in front of or in the rear of a polarizing film consisting of the polarizing filter 2 alone or a polarizing film in which the optically-active film 102 and the polarizing filter 103 are attached together. Then, when scanning lines constituting first and second fields for interlaced scanning are respectively positioned so as to correspond to the optically-active portions 102a and the optically-inactive portions 102b, for example, such that the image for one of the right and left eyes and the image for the other are respectively displayed in the first and second fields; the image information for the left eye can be output as being carried by the polarized light component introduced into the polarized film with its plane of polarization in the first direction while the image information for the right eye can be output as being carried by the polarized light component introduced into the polarized light with its plane of polarization in the second direction. This case can handle both still and moving pictures according to the signal input into the color liquid crystal display panel.

Also, without being restricted to the foregoing embodiments, the three-dimensional image displaying apparatus in accordance with the present invention may be modified in various ways. For example, the convex Fresnel lens may be substituted by a holographic lens or a diffraction grating lens. Also, an array of lenses each having a short focal length can be used in order to reduce the distance between the lens and the liquid crystal television screen.

The television camera may be disposed on the optical axis of the convex lens by means of a half mirror or the like. Without being restricted to the infrared, the illuminating light source may emit any radiation including visible light and ultraviolet rays as long as the television camera is sensitive to the wavelength thereof. The position and number of the illuminating light sources can be selected appropriately.

In lieu of the camera, a system for effecting a predetermined post-processing of the image may be used by means of microwaves, ultrasonic waves, or the like.

When an auto-focus camera is used as the television camera, the apparatus may have a function for automatically adjusting the distance between the lens and the image output surface of the monochrome liquid crystal television screen in synchronization with the auto-focus. Also, a large convex lens, a convex Fresnel lens, a holographic lens, a diffraction grating lens, or an array of such lenses can be disposed on the image output surface of the monochrome liquid crystal television screen in order to increase its efficiency as the backlight.

As a synthetic binary-coded image to be input into the monochrome liquid crystal television screen, a negative image of one image may not necessarily be used as long as an image combining binary-coded right and left half face images of the observer can be synthesized.

While the monochrome liquid crystal television screen is used as the backlight light source in the foregoing embodiment, a plasma display, a neon-tube display, a solid light-emitting device, a thin CRT, an array of CRTs, or the like may be used in lieu thereof. Of course, various light sources other than these displays may be used as the light source for backlight.

As explained in the foregoing, in the polarizing film in accordance with the present invention comprising the polarizing filter and image display or the optically-active film, polarizing film, and image display which are laminated together, image recording can be effected with less labor, in a larger screen size, and with a less cost as compared with such a technology as holography.

Also, the apparatus for displaying a three-dimensional image using this polarizing film is simpler in structure and can be manufactured less expensively as compared with such a technology as holography.

What is claimed is:

1. An apparatus for displaying a three-dimensional image using a polarizing film said film comprising:

a film-like polarizing filter composed of alternately arranged first and second polarizing filter pieces which respectively have first and second axes of easy transmission of polarized light, said axes being perpendicular to each other;

an image display print film composed of alternately arranged first and second display portions respectively showing first and second images;

said polarizing filter and the image display being combined together such that said first and second filter pieces respectively face said first and second image display portions;

a backlight output means for outputting, as a backlight component for right-eye viewing, one of polarized light components output from said polarizing film through optically-active and optically-inactive portions, while outputting the other as a backlight component for left-eye viewing; and a convex lens which functions such that a light image formed by the two polarized light components from said backlight output means can be recognized by an observer, who is positioned on the opposite side of said backlight output means by way of said polarizing film, as an enlarged virtual image and thereby a background of said polarizing film placed at a predetermined position in front of said observer is illuminated.

2. An apparatus for displaying a three-dimensional image using the polarizing film according to claim 1 in which said backlight output means comprises a television screen and the light image functioning as said backlight component for right eye viewing and the light image functioning as said backlight for left-eye viewing respectively correspond to light images of right-side and left-side face images of said observer or vicinities thereof displayed on said television screen.

3. The apparatus in accordance with claim 1 wherein said convex lens is greater than one focal length from the backlight output means.

4. The apparatus in accordance with claim 1 further comprising a source of infrared light;

a television camera for sensing said infrared light;

a means for coding the image received from the television camera according to luminescence;

means for interlacing first and second images and providing said interlaced signals to a television display tube;

means for directing said first and second interlaced light signals from said tube to first and second polarized states of a liquid crystal screen, and generating polarized light in opposite direction from said first and second polarized crystals; and means for directing said first and second polarized light to said convex lens, and then to said film.

5. The apparatus in accordance with claim 1 further comprising:

a means for illuminating either a right or left side of a viewer's face;

means responsive to said illuminating means for controlling the intensity of polarized light components from said backlight output means; and wherein said means for controlling intensity is controlled in accordance with light reflected from the illuminated side.

6. An apparatus for displaying a three-dimensional image using a polarizing film said film comprising:

a film-like polarizing filter composed of alternately arranged first and second polarizing filter pieces which respectively have first and second axes of easy transmission of polarized light, said axes being perpendicular to each other;

an image display print film composed of alternately arranged first and second display portions respectively showing first and second images;

said polarizing filter and the image display being combined together such that said first and second filter pieces respectively face said first and second image display portions;

a backlight output means for outputting, as a backlight component for right-eye viewing, one of polarized light components passing through said first and second polarizing filter pieces, as a backlight component for right-eye viewing, while outputting the other as a backlight component for left-eye viewing; and a convex lens which functions such that a light image formed by the two polarized light components from said backlight output means can be recognized by an observer, who is positioned on the opposite side of said backlight output means by way of said polarizing film, as an enlarged virtual image and thereby a background of said polarizing film placed at a predetermined position in front of said observer is illuminated.

7. An apparatus for displaying a three-dimensional image using the polarizing film according to claim 6 in which said backlight output means comprises a television screen and the light image functioning as said backlight component for right-eye viewing and the light image functioning as said backlight for left-eye viewing respectively correspond to light images of right-side and left-side face images of said observer or vicinities thereof displayed on said television screen.

8. The apparatus in accordance with claim 6 wherein said convex lens is greater than one focal length from the backlight output means.

9. The apparatus in accordance with claim 6 further comprising:

a source of infrared light;

a television camera for sensing said infrared light;

a means for coding the image received from the television camera according to luminescence;

means for interlacing first and second images and providing said interlaced signals to a television display tube;

means for directing said first and second interlaced light signals from said tube to first and second polarized states of a liquid crystal screen, and generating polarized light in opposite direction from said first and second polarized crystals; and means for directing said first and second polarized light to said convex lens, and then to said film.

10. The apparatus in accordance with claim 6 further comprising:

a means for illuminating either a right or left side of a viewer's face;

means responsive to said illuminating means for controlling the intensity of polarized light components from said backlight output means; and wherein said means for controlling intensity is controlled in accordance with light reflected from the illuminated side.

* * * * *